(12) United States Patent
Mustad et al.

(10) Patent No.: US 7,559,498 B2
(45) Date of Patent: Jul. 14, 2009

(54) FISHING REEL WITH INSULATED CARBON FIBER DRAG

(75) Inventors: Andreas Mustad, Coral Gables, FL (US); Kristen Mustad, Aventura, FL (US)

(73) Assignee: Arbortech USA, L.L.C

( * ) Notice: Subject to any disclaimer, the term of this patent is extended or adjusted under 35 U.S.C. 154(b) by 0 days.

(21) Appl. No.: 11/851,427

(22) Filed: Sep. 7, 2007

(65) Prior Publication Data

US 2008/0061178 A1 Mar. 13, 2008

Related U.S. Application Data

(60) Provisional application No. 60/825,000, filed on Sep. 8, 2006.

(51) Int. Cl.
*A01K 89/00* (2006.01)
*A01K 89/02* (2006.01)

(52) U.S. Cl. ................................................ 242/244

(58) Field of Classification Search ......... 242/243–246, 242/285, 290, 291, 302, 303
See application file for complete search history.

(56) References Cited

U.S. PATENT DOCUMENTS

| | | | | |
|---|---|---|---|---|
| 3,961,438 A | * | 6/1976 | Henze et al. | 43/27.4 |
| 4,251,940 A | * | 2/1981 | Henze et al. | 43/27.4 |
| 5,222,688 A | * | 6/1993 | Forslund et al. | 242/246 |
| 6,155,508 A | * | 12/2000 | Lepage | 242/303 |
| 6,318,655 B1 | * | 11/2001 | Henze | 242/244 |
| 6,851,637 B2 | * | 2/2005 | Gilmore | 242/318 |
| 6,964,389 B2 | * | 11/2005 | Hill et al. | 242/301 |
| 7,017,845 B2 | * | 3/2006 | Clark | 242/244 |
| 7,168,647 B1 | * | 1/2007 | Kang | 242/303 |
| 2003/0010856 A1 | * | 1/2003 | Katayama et al. | 242/246 |
| 2005/0274837 A1 | * | 12/2005 | Clark | 242/243 |

\* cited by examiner

*Primary Examiner*—Evan H Langdon
(74) *Attorney, Agent, or Firm*—Lott & Friedland, P.A.

(57) ABSTRACT

Disclosed is a fishing reel comprising a rotating spool having a contact surface; a drag plate assembly; the drag plate assembly comprising a drag plate having a surface, a thermal insulating layer lining the drag plate surface and a carbon fiber liner lining the insulating layer; the drag plate assembly being disposed so that the carbon fiber liner abuts the rotating spool's contact surface; and means for compressing the drag plate assembly against the rotating spool so as to effect contact between the drag plate assembly and the rotating spool contact surface; wherein the thermal insulating layer is comprised from a material selected form the group comprised of: cork, polyurethane, acetal, neoprene, Kevlar, ceramic, and combinations thereof; and wherein the means for compressing the drag plate assembly against the rotating spool is either a draw bar type drag, a gear type drag, a hydraulic type drag or hybrids thereof.

2 Claims, 3 Drawing Sheets

FISHING REEL WITH INSULATED CARBON FIBER DRAG

CLAIM OF PRIORITY

This application is a non-provisional application of provisional U.S. patent application Ser. No. 60/825,000, filed on Sep. 8, 2006, the contents of which are incorporated herein by reference.

TECHNICAL FIELD

The present invention relates generally to the field of fishing reels and more specifically to fly fishing reels. Specifically, the disclosed invention relates to a fly fishing reel incorporating an insulated carbon fiber drag mechanism which provides superior performance to drag mechanisms heretofore known.

BACKGROUND OF THE INVENTION

Most modern fly fishing reels are equipped with a directional clutch and brake arrangement (commonly referred to as a drag mechanism) which allows for free spinning of the reel when line is taken in an and adjustable level of resistance on the rotation of the reel when line is being let out. The purpose of the resistance, or "drag", is to maintain a constant level of tension on the line once a fish is hooked without completely binding the reel which could result in a broken line.

The most common type of drag utilized in fly fishing reels is a draw bar type disc drag mechanism. Other types of mechanisms, such as gear drags or hydraulic drags are also well known.

In a draw bar type of drag mechanism, a substantially flat drag plate is coaxially mounted with respect to the rotating spool portion of the reel using a clutch mechanism which can be achieved in a number of ways: by way of incorporating a one-way clutch bearing in the drag assembly, a directional spring loaded ratchet mechanism (commonly referred to as a pawl mechanism), or any other mechanism that allows for rotation in a single direction whilst preventing rotation in the other direction. The drag plate is mounted so that its face abuts the rotating spool, or alternatively, a separate element that is mechanically affixed, or otherwise coupled, to the rotating spool. The face of the drag plate that interfaces with the rotating spool is lined with a friction-producing material. The drag plate is held in juxtaposition to the rotating spool by means of an adjusting mechanism. The adjusting mechanism enables the reel's operator to adjust the pressure with which the drag plate is held against the rotating spool or corresponding element.

In operation, the clutch mechanism permits the drag plate to rotate in conjunction with the rotating spool when line is being taken into the reel. When line is being let out of the reel, the one-way clutch holds the drag plate stationary in relation to the rotating spool. By holding the drag plate stationary, friction is created between the rotating spool and drag surface affixed or otherwise coupled to the drag plate. The friction acts as a drag against the rotating spool and (assuming the force with which the line is being taken out remains constant) slows its rate of rotation. By adjusting the pressure exerted by the drag plate against the rotating spool through the adjustment mechanism, the amount of friction between these elements can be varied and the drag can be thus optimized to the liking of the operator.

A common type of disk drag mechanism in fly fishing reels utilizes cork as the friction-producing material. Cork is good material for a drag plate lining due to the fact that it is compressible and this creates a smooth, constant drag pressure. Cork is also resistant to heat and water and is capable of producing a wide range of drag resistance with proper adjustment and lubrication.

Cork, however, has definite drawbacks. The most salient drawback is that cork requires periodic lubrication. An unlubricated cork drag will quickly break up under strenuous use. The need for lubrication prevents the use of cork in "sealed" drag mechanisms and adds the requirement of periodic maintenance. Another drawback of cork drags is that when wet they have a tendency to either "hydroplane", and thus be completely ineffective, or vibrate (also known as "chatter.") Finally, cork drags have relatively high breakaway friction, (also commonly misnomered as startup inertia within the fly fishing industry). That is, at the very beginning of engaging pressure on the line, before rotation of the spool has begun, as pressure is applied in increasing force on the drag, until that force exceeds the drag's static resistance (breakaway friction), and rotation begins, the drag resistance is slightly greater (or much greater, depending on the drag interface material) than it is during rotation (running friction). This means that in order to maintain a truly constant level of drag, an operator has to periodically increase and decrease the drag plate pressure to adjust for this differential in drag every time the spool comes to a full stop.

A popular alternative to cork is carbon fiber. Carbon fiber offers the advantages of being a self-lubricating drag material which permits its use in sealed mechanisms and eliminates the need for external lubrication or maintenance. Carbon fiber is also not negatively impacted by water in the same way cork is, hence its wide range of application from automobile brakes to fly fishing reels. Finally, carbon fiber offers virtually no breakaway friction (startup inertia) against a smooth breaking surface.

However, carbon fiber, like cork, has drawbacks in its application for fly fishing reels. The principal drawback is that carbon fiber is not nearly as efficient a thermal insulator as cork. In a cork disk drag mechanism, virtually all of the heat that is created at the interface of the drag plate lining and the rotating spool is dissipated into the rotating spool. This is so because cork is a thermal insulator which does not absorb heat and prevents any heat from conducting to, and building up on, the drag plate. Dissipation of heat into the rotating spool is desirable because it is a relatively large mass component which is able to absorb and dissipate the heat without any significant rise in temperature. Further, because the spool is rotating and thus exposed to significant air circulation, the heat is easily transferred out of the spool.

By contrast, in a carbon fiber disk drag mechanism, the carbon fiber lining is very thin and during prolonged periods of running friction, absorbs, retains and transfers heat very well. The heat, rather than being entirely dissipated by the rotating spool, is partially transferred to the drag plate. The amount of heat generated by a carbon fiber disk drag mechanism is surprisingly high. Temperatures often exceed 300° F. As a result of this, the drag plate, which is static, can become very hot. This heat is in turn transferred to other elements of the reel, namely the bearings supporting the rotation of the drag plate, and the one-way clutch (if present). This heat build up causes the lubricant in the bearings and one-way clutch to liquefy and leak out of the bearings, break down and eventually causes the bearings to fail. Thus, reels employing conventional carbon fiber disk drag mechanisms have a much lower reliability when compared to those using cork when large amounts of drag are required. This is why traditionally, offshore or big game fly fishing reels have mostly employed cork drags, Another impact of the heat transfer to the drag plate is the resulting expansion of the drag plate (or drag plates if in a stacked drag assembly commonly used in fly fishing reels where the spool's interfacing surface is limited). This expansion, especially in a stacked drag assembly, causes the pressure, and accordingly the friction produced, between the drag plate(s) and the rotating spool to increase in direct proportion to the rotational rate of the spool. As the pressure increases so does friction and drag force. Therefore, with a carbon fiber disk drag mechanism the operator must adjust the drag downwards or risk too much drag being applied and the line breaking. Once the spool cools down, an upwards adjustment to the drag is needed as the pressure decreases due to the contraction of the cooling drag plate.

Accordingly, there is a need in the relevant field of art for a fly fishing reel with a drag mechanism that combines the advantages of cork and carbon fiber mechanisms. Specifically, there is a need for a fishing reel with a drag mechanism that is self-lubricating, has very low breakaway friction (start-up inertia), is heat and moisture resistant and provides smooth, constant drag pressure in most conditions without the need for repeated adjustment.

SUMMARY OF THE INVENTION

The subject invention resolves the above-described needs and problems by providing a fly fishing reel with a thermally insulated disc-type drag mechanism. According to an embodiment of the present invention, a drag plate assembly is coaxially mounted with respect to the rotating spool portion of the reel using a roller bearing and a one-way clutch. The drag plate assembly is mounted so that its face abuts the rotating spool, or alternatively, a corresponding element that is mechanically affixed, or otherwise coupled, to the rotating spool.

The face of the drag plate assembly that interfaces with the rotating spool is lined with carbon fiber. Interposed between the carbon fiber liner and a drag plate is a layer of a thermal insulating material, such as cork, polyurethane, acetal, neoprene, Kevlar, ceramics, fiberglass, vulcanized rubber, asbestos, polyetheretherketones or other suitable thermal insulating material. The drag plate is held in juxtaposition to the rotating spool by means of an adjustable pressure mechanism. The adjustable pressure mechanism enables the reel's operator to adjust the pressure with which the drag plate assembly is held against the rotating spool or corresponding element.

In operation, the one-way clutch, (or ratchet mechanism) permits the drag plate assembly to rotate in conjunction with the rotating spool when line is being taken into the reel. When line is being let out of the reel, the one-way clutch holds the drag plate assembly stationary in relation to the rotating spool. By holding the drag plate stationary, friction is created between the rotating spool and drag plate assembly and the rate of rotation of the rotating spool is correspondingly slowed.

The friction acts as a drag against the rotating spool and slows its rate of rotation. By adjusting the pressure exerted by the drag plate assembly against the rotating spool through the adjustable pressure mechanism, the amount of friction between these elements can be varied and the drag can be thus optimized to the liking of the operator.

The thermal insulating material interposed between the carbon fiber and the drag plate serves as a heat barrier and prevents the drag plate from heating up by reflecting the heat absorbed and transmitted by the carbon fiber back to the carbon fiber and in turn the rotating spool. This heat can be much more easily and efficiently dissipated by the rotating spool since it has much greater mass than the drag plate assembly and since its rotational motion creates a natural air cooling effect. In this fashion, all of the benefits of both carbon fiber and cork drags are achieved with none of the drawbacks.

Accordingly, disclosed is a fishing reel comprising a rotating spool having a contact surface; a drag plate assembly; the drag plate assembly comprising a drag plate having a surface, a thermal insulating layer lining the drag plate surface and a carbon fiber liner lining the insulating layer; the drag plate assembly being disposed so that the carbon fiber liner abuts the rotating spool's contact surface; and means for compressing the drag plate assembly against the rotating spool so as to effect contact between the drag plate assembly and the rotating spool contact surface; wherein the thermal insulating layer is comprised from a material selected form the group comprised of: cork, polyurethane, acetal, neoprene, Kevlar, ceramic, fiberglass, vulcanized rubber, asbestos, polyetheretherketones and combinations thereof; and wherein the means for compressing the drag plate assembly against the rotating spool is either a draw bar type drag, a gear type drag, a hydraulic type drag or hybrids thereof.

It is one object of the present invention to provide a fly fishing reel with a novel disk drag mechanism that combines the advantages of cork and carbon fiber mechanisms. Specifically, the invention described herein provides a fly fishing reel with a disk drag mechanism that is self-lubricating, has very low breakaway friction (start-up inertia), is heat and moisture resistant and provides smooth, constant drag pressure in most conditions without the need for repeated adjustment or maintenance.

This and other objects, features, and advantages of the present invention may be more clearly understood and appreciated from a review of ensuing detailed description of the preferred and alternate embodiments and by reference to the accompanying drawings and claims.

DETAILED DESCRIPTION OF THE DRAWINGS

While the present invention will be described more fully hereinafter with reference to the accompanying drawings, in which an embodiment of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

For simplicity, the fewest possible components needed to understand the operation of the present invention are depicted in the accompanying figures. The figures, therefore, exclude other items such as a reel foot, which is used to affix the housing to the fishing rod; the handle, used to crank the line back onto the spool once the fish has stopped running; screws, and other elements that are unnecessary to form an enabling understanding of the invention's operation.

For purposes of illustration, the embodiment of the present invention shown in the accompanying figures utilizes a draw bar type drag. However, as explained above, other drag types, such as gear drags or hydraulic drags are also well known and could be similarly employed with the disclosed invention.

Figure 1:
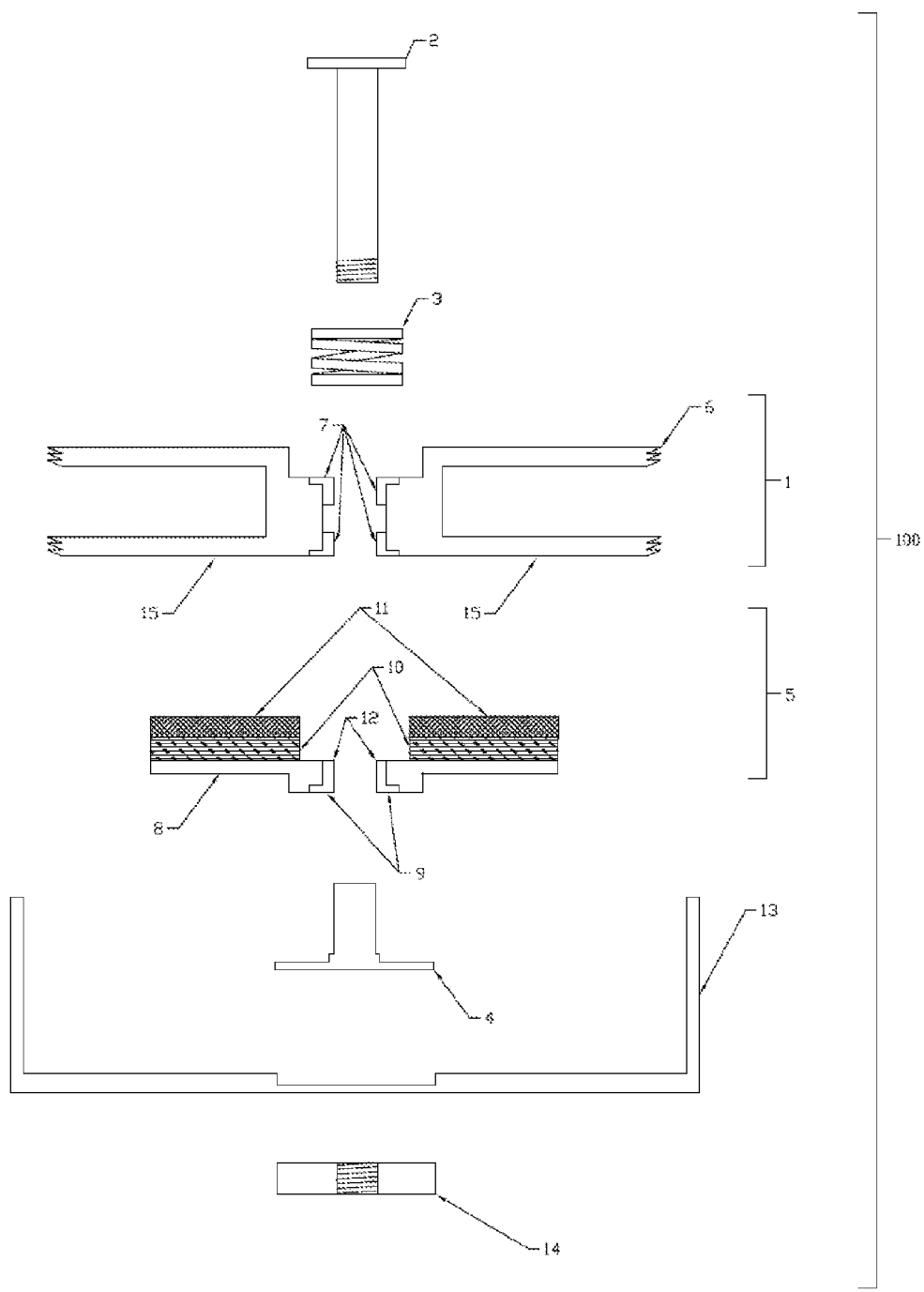
FIG. 1 shows an exploded cross sectional view of a fly fishing reel that embodies the present invention.

Referring initially to FIG. 1, shown is an exploded cross sectional view of a fishing reel (100) that embodies the present invention. The components of the reel (100) are a rotating spool assembly (1), a draw bar (2), a drag spring (3), a spool shaft (4) a drag plate assembly (5), a housing (13) and a drag knob (14).

The rotating spool assembly (1) comprises a spool (6), a spool contact surface (15) and spool bearings (7). Alternatively, instead of a spool contact surface (15), the rotating spool assembly (1) could have a spool contact element (not shown) that is mechanically affixed, or otherwise coupled, to said spool (6) and thus rotates along with the rotating spool assembly (1).

The drag plate assembly (5) comprises a drag plate (8), a drag plate bearing (9) a thermal insulating layer (10) a carbon fiber element (11) and a one-way clutch (12). The thermal insulating layer (10) being comprised of cork, polyurethane, acetal, neoprene, Kevlar, ceramics, fiberglass, vulcanized rubber, asbestos, polyetheretherketones or other suitable thermal insulating material with a high melting temperature.

Figure 2:
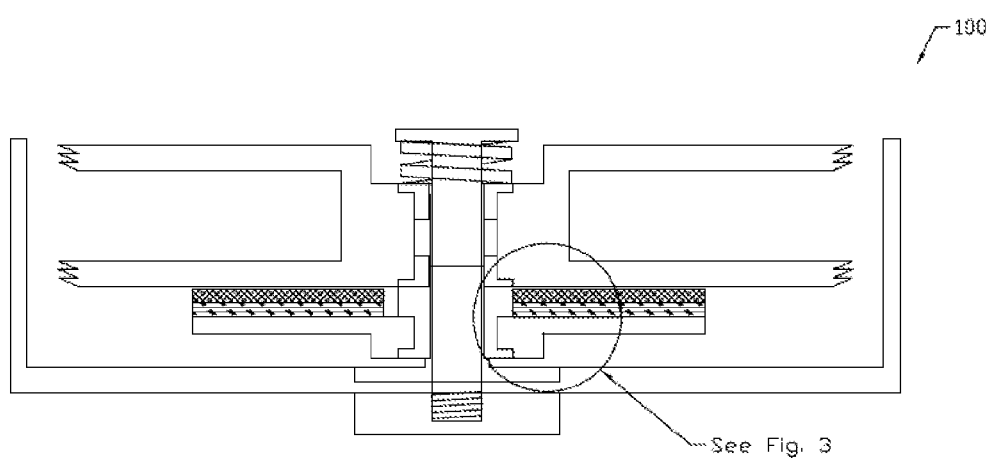
FIG. 2 shows an assembled cross sectional view of a fly fishing reel that embodies the present invention.

Shown in FIG. 2 is the reel (100) fully assembled. As can be seen in FIGS. 1 and 2, the rotating spool assembly (1) and drag plate assembly (5) are joined by introducing the spool shaft (4) through the spool bearings (7) and drag plate bearing (9) and one-way clutch (12).

The drag shaft is introduced through the drag spring (3) and spool shaft (4), and the free end of the draw bar (2) (also known as the drag shaft) is threaded to adjust the pressure via the drag knob (14) against the housing (13).

As the drag knob (14) is tightened, the drag spring (3) is compressed against the inside track of the spool's top bearing (7) and the pressure between the spool contact surface (15) and the carbon fiber element (11) is increased. The increase in pressure results in an increase in drag.

As indicated above, in operation, the one-way clutch (12) permits the drag plate assembly (5) to rotate in conjunction with the rotating spool assembly (1) when line is being taken into the reel (100). When line is being let out of the reel (100), the one-way clutch (12) holds the drag plate assembly (5) stationary in relation to the rotating spool assembly (1).

By holding the drag plate assembly (5) stationary, friction is created between the rotating spool assembly's contact surface (15) and the drag plate assembly (5) and the rate of rotation of the rotating spool assembly (1) is correspondingly slowed.

The friction acts as a drag against the rotating spool assembly's contact surface (15) and slows the rotating spool assembly's (1) rate of rotation. The pressure exerted by the drag plate assembly (5) against the rotating spool assembly (1) can be adjusted by means of the draw bar (2), a drag spring (3) and drag knob (14). In order to increase drag, the drag knob (14) is tightened. In order to decrease drag, the drag knob (14) is loosened. In this way the drag can be optimized to the preference of the operator angler.

The rotating spool assembly (1) comprises a spool (6) and spool bearings (7). The drag plate assembly (5) comprises a drag plate (8), a drag plate bearing (9) a thermal insulating layer (10) a carbon fiber element (11) and a one way clutch (12).

When the drag is engaged, the friction between the drag plate assembly (5) and the rotating spool assembly (1) naturally generates heat. The thermal insulating layer (10) interposed between the carbon fiber element (11) and the drag plate (8) serves as a heat barrier that prevents the drag plate (8) from absorbing such heat and instead reflects the heat back through the carbon fiber element (11) into the rotating spool assembly (1) where it is more easily and efficiently dissipated by the rotating spool assembly's (1) greater mass and the than the natural air cooling effect created by its rotational motion.

Figure 3:
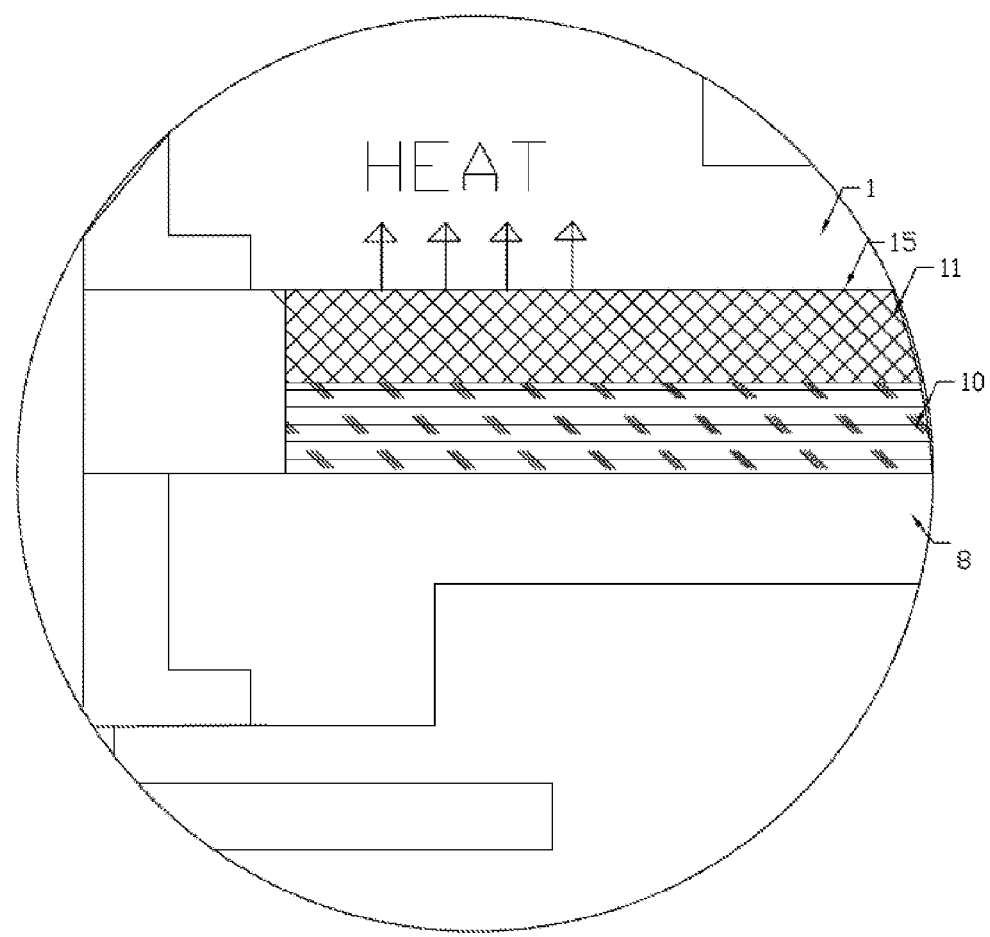
FIG. 3 shows a close-up view of the interface between the spool face and the carbon fiber element of the present invention.

FIG. 3 shows a close-up view of the interface between the spool contact surface (15) and the drag plate assembly's (5) carbon fiber element (11) and depicts the flow of heat from the carbon fiber element (11) into the rotating spool assembly (1) As can be seen in FIG. 3, the heat that is generated by the friction between the carbon fiber element (11) and the rotating spool assembly (1) is blocked by the thermal insulating layer (10) and therefore flows only in the direction of the rotating spool assembly (1) where it is more efficiently dissipated and where it cannot do any harm to the bearings or clutch, or cause expansion of the drag plate (8), which would in turn cause additional friction to occur.

Accordingly, disclosed herein is a fly fishing reel with a novel disk drag mechanism that combines the advantages of cork and carbon fiber mechanisms. Specifically, the invention described herein provides a fly fishing reel with a disk drag mechanism that does not require lubrication, has very low start-up inertia, is heat and moisture resistant and provides smooth, constant drag pressure in most conditions without the need for repeated adjustment.

It will be understood that one embodiment of the present invention has been disclosed by way of example and that other modifications and alterations may occur to those skilled in the art without departing from the scope and spirit of the appended claims.

What is claimed is:

1. A fishing reel comprising:
a rotating spool having a contact surface;
a drag plate assembly;
said drag plate assembly comprising a drag plate having a surface, a thermal insulating layer lining said drag plate surface, and a carbon fiber liner lining said insulating layer;
said drag plate assembly being disposed so that said carbon fiber liner abuts said rotating spool's contact surface; and
means for compressing said drag plate assembly against said rotating spool so as to effect contact between said drag plate assembly and said rotating spool contact surface;
wherein said thermal insulating later is comprised from a material selected from the group comprised of: cork, polyurethane, acetal, neoprene, Kevlar, ceramic, and combinations thereof;
wherein said means for compressing said drag plate assembly against said rotating spool is either a draw bar drag, a gear drag, or hybrids thereof.

2. A fishing reel comprising:
a rotating spool having a contact surface wherein said rotating spool contact surface is a separate element that is mechanically affixed to or coupled to said rotating spool;
a drag plate assembly;
said drag plate assembly comprising a drag plate having a surface, a thermal insulating layer lining said drag plate surface, a carbon fiber liner lining said insulating layer, a drag plate bearing and a one-way clutch;

said drag plate assembly being disposed so that said carbon fiber liner abuts said rotating spool's contact surface;

said thermal insulating layer being interposed between said drag plate and said carbon fiber liner;

means for compressing said drag plate assembly against said rotating spool so as to effect contact between said carbon fiber lining and said rotating spool contact surface;

wherein said thermal insulating layer is disposed as a heat barrier preventing said drag plate, drag plate bearing and one-way clutch from absorbing heat generated by friction between said carbon fiber lining and said rotating spool contact surface;

wherein said thermal insulating layer is disposed to reflect heat generated by friction between said carbon fiber lining and said rotating spool contact surface into said rotating spool;

wherein said reflected heat is dissipated by air cooling effected through said rotating spool's rotational motion;

wherein said thermal insulating layer is comprised of cork; and wherein said means for compressing said drag plate assembly against said rotating spool is a draw bar drag.

* * * * *